United States Patent [19]

Tashiro et al.

[11] Patent Number: 5,193,095
[45] Date of Patent: Mar. 9, 1993

[54] MULTIMODE RAMAN LASER SYSTEM

[75] Inventors: Hideo Tashiro; Katsumi Midorikawa, both of Saitama; Mitsutoshi Suzuki, Ibaraki, all of Japan

[73] Assignee: Doryokuro Kakunenryo Kaihatsu Jigyodan, Tokyo, Japan

[21] Appl. No.: 676,008

[22] Filed: Mar. 27, 1991

[30] Foreign Application Priority Data

Mar. 28, 1990 [JP] Japan .................................. 2-81906

[51] Int. Cl.$^5$ ............................................... H01S 3/30
[52] U.S. Cl. ........................................... 372/3; 372/95; 372/99
[58] Field of Search ........................... 372/3, 83, 95, 99

[56] References Cited

U.S. PATENT DOCUMENTS 4,361,770 11/1982 Rabinowitz et al. .................... 372/3
4,918,704 3/1990 Caprara et al. ........................ 372/95
5,033,051 7/1991 Werner ................................... 372/3

OTHER PUBLICATIONS

G. Salvetti, "Operation of an Unstable Resonator TE $CO_2$ Laser with Large Electrode Spacing Using Additives", *Optics Communications* vol. 30, No. 3, Sep. 1979, pp. 397-402.

*Primary Examiner*—James W. Davie
*Attorney, Agent, or Firm*—Armstrong & Kubovcik

[57] ABSTRACT

A multi-mode Raman laser system wherein Raman conversion is performed by injecting exciting laser beam from transversely excited atmospheric pressure $CO_2$ laser system into a Raman cell. Unstable resonator type oscillator is used as transversely excited atmospheric pressure $CO_2$ laser system; and multi-mode Raman cell is used as the Raman cell. The quantity required for an excited $CO_2$ laser system can thus be extensively reduced. Also, it is possible to reduce the input electric required for obtaining the same energy of 16 $\mu$m light which is scattered light, because saturated conversion of excited light, can be achieved by multimode Raman cell, and system efficiency can be increased.

3 Claims, 4 Drawing Sheets

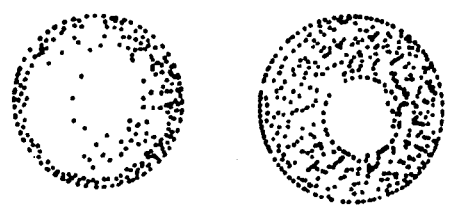
FIG.3(a)   FIG.3(b)
FIG. 4
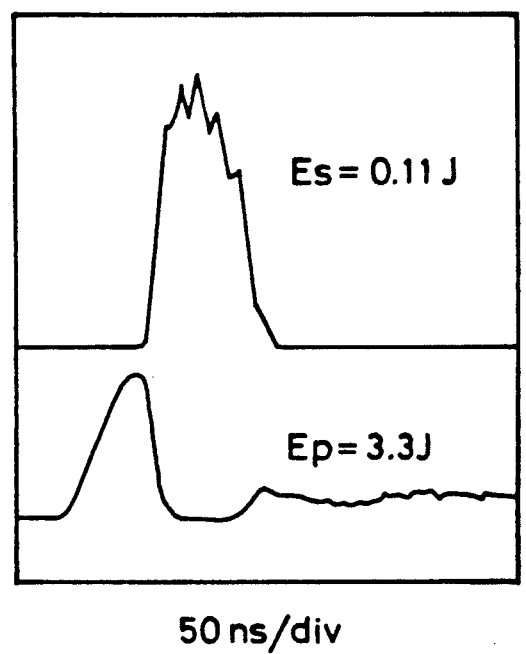
50 ns/div

MULTIMODE RAMAN LASER SYSTEM

BACKGROUND OF THE INVENTION

The present invention relates to a multimode Raman laser system, and in particular to a multimode Raman laser system suitable for generating high output parahydrogen Raman laser beam (16 μm) to be used for molecular laser isotope separation for uranium enrichment.

In the past, the following method has been known as a method to generate high output parahydrogen Raman laser beam (16 μm) to be used for molecular laser uranium enrichment method: As shown in FIG. 6, laser beam from transversely excited atmospheric pressure (TEA) $CO_2$ laser system 1 comprising a stable resonator type oscillator is circularly polarized by a circularly polarizing element (not shown), and Raman conversion is performed by injecting the exciting laser beam 3, amplified to high output by multi-stage amplifier 2 called MOPA (Master Oscillator Power Amplifier), into Raman cell 4 filled with parahydrogen.

In the conventional system as described above, the exciting laser beam is obtained from TEA $CO_2$ laser system 1 using stable resonator type oscillator, and it was disadvantageous in that conversion efficiency from input electric energy to light energy is low because loss occurs in the aperture of stable resonator type oscillator.

Also, because laser beam from TEA $CO_2$ laser system 1 is used as circularly polarizing light required from Raman conversion and the circularly polarized element is low in strength, the laser beam emitted from TEA $CO_2$ laser system must be passed through the circularly polarizing element at low output level. Therefore, the laser beam thus circularly polarized must be amplified by multi-stage amplifier (MOPA) before it is injected into Raman cell 4. Particularly, in case $CO_2$ laser with weaker oscillation line (wavelength with lower gain such as 10R(32)) is used, the number of the amplifiers 2 must be extremely increased. This results in more complicated system and higher facility cost.

As described above, conventional type Raman laser system has been disadvantageous in that the conversion efficiency from input electric energy to light energy is low because loss occurs in the aperture in stable resonator type oscillator and that complicated system and expensive facility cost are required because multi-stage amplifiers are needed.

SUMMARY OF THE INVENTION

To overcome such disadvantages, the object of the present invention is to offer a Raman laser system, which has high conversion efficiency from input electric energy to light energy and does not need multi-stage amplifiers because unstable resonator type oscillator is used as TEA $CO_2$ laser apparatus and multimode Raman cell is used as Raman cell.

To solve the above problems, in the Raman laser system according to the present invention, Raman conversion is performed by injecting exciting laser beam from TEA $CO_2$ laser system into Raman cell, and it is characterized in that unstable resonator type oscillator is used as said TEA $CO_2$ laser system and that multimode Raman cell is used as said Raman cell.

In the Raman laser system according to this invention, TEA $CO_2$ laser system comprising unstable resonator oscillator emits high output circularly polarized multimode $CO_2$ laser beam of 10.6 μm by the means such as the injection of circularly polarized laser beam. Near field pattern of this multimode $CO_2$ laser beam is ring-like pattern, while far field pattern has sharp high output level at its center. This circularly polarized $CO_2$ beam having sharp high output level at its center is irradiated into multimode Raman cell filled with parahydrogen, and scattered light of 16 μm is issued after saturated conversion.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3(a) shows near field pattern and FIG. 3(b) shows far field pattern of multimode beam;

FIG. 4 represents waveform and energy (Es) of scattered light after saturated Raman conversion and waveform and energy (Ep) of non-converted excited light;

DESCRIPTION OF THE PREFERRED EMBODIMENT

In the following, description is given on an embodiment of this invention.

Figure 1:
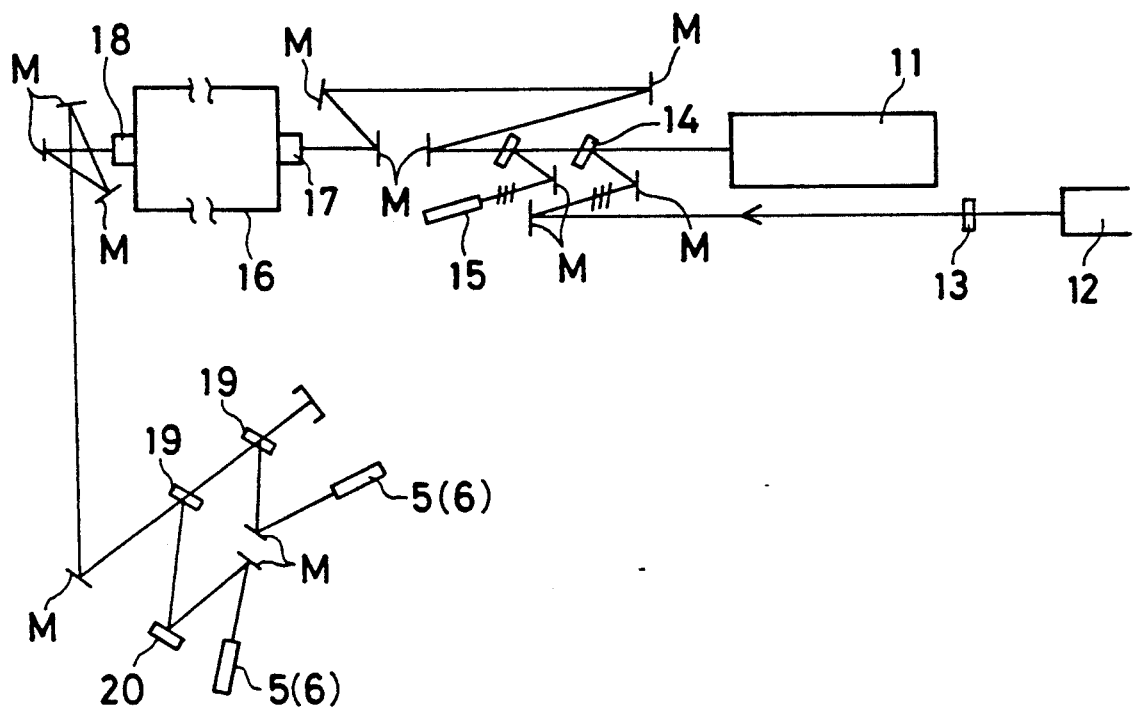
FIG. 1 shows an arrangement of an embodiment of Raman laser system according to this invention.

FIG. 1 is an example of the system used for the present invention. Unstable resonator type oscillator is used as high output TEA $CO_2$ laser system 11, and single longitudinal mode CW-$CO_2$ laser system 12 is used as light source to emit weak circularly polarized light. In the high output TEA $CO_2$ laser system 11 comprising unstable resonator type oscillator used in this embodiment, a concave mirror with curvature of 30 mR having Au/Si reflecting surface and a convex mirror with curvature of 24 mR having ZnSe reflection film with reflectivity gradually decreased from center to outer periphery are placed face-to-face to each other within the resonator, and the gas having composition of $CO_2$ : $N_2$ : He = 1 : 1.4 : 4 is filled inside. This TEA $CO_2$ laser system 11 has charging voltage of 22 kV, and energy per pulse in case of repeating 1 Hz is 4.8 J.

On the other hand, $CO_2$ laser beam with weak intensity is emitted from CW-$CO_2$ laser system 12. This laser beam is circularly polarized by the circularly polarizing element 13 having λ/4 wave plate and enters from KCl plate 14 to TEA $CO_2$ laser 11.

The circularly polarized laser beam emitted into TEA $CO_2$ laser system 11 plays predominant role when oscillation is started in TEA $CO_2$ laser system 11. By the wavelength of injected laser beam, circularly polarized component rapidly grows on the polarization plane, and circularly polarized high output laser beam with wavelength of 10.6 μm is outputted.

The waveform of outputted laser beam after this injection is observed by photon drag detection element 15.

The circularly polarized high output laser beam from TEA $CO_2$ laser system 11 is injected into multi-mode Raman cell 16. The Raman cell 16 for multimode comprises a pair of concave mirrors, having a SUS (stainless steel) pipe furnished with laser beam injection hole 17 and laser beam output hole 18 separately at each end, and said concave mirrors are placed face-to-face to each other airtightly and parahydrogen is filled inside the SUS pipe. The circularly polarized high output laser beam entering from laser beam injection hole 17 of Raman cell 16 for multimode repeats reflection on mirror surface of the above pair of concave mirrors, and scattered light of 16 μm is generated by Raman effect of parahydrogen. This scattered light is emitted through laser beam output hole 18.

The laser beam outputted from multimode Raman cell 16 is separated to excited light and scattered light, and waveform and energy are measured respectively by photon drag detection element and energy meter 5 and 6. In this figure, 19 represents a KCl plate, 20 a LiF plate, and M a reflection mirror.

Figure 2:
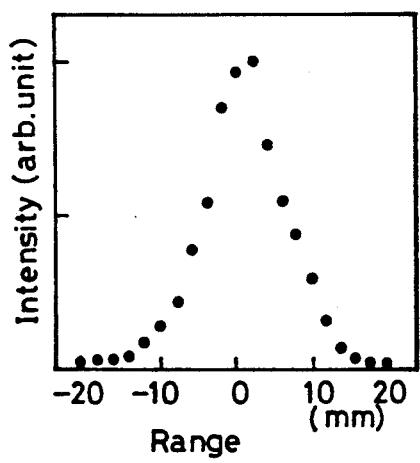
FIG. 2 shows intensity distribution in radial direction of multimode beam emitted from TEA $CO_2$ laser system in this embodiment.

FIG. 2 shows intensity distribution in radial direction of multimode beam emitted from TEA $CO_2$ laser apparatus 11 in this embodiment. As it is evident from this figure, the multimode beam has its central portion rising up, showing typical multimode beam. FIG. 3(a) shows near field pattern FIG. 3(b) shows and far field pattern of this multimode beam.

FIG. 4 represents waveform and energy (Es) of scattered light after saturated conversion and waveform and energy (Ep) of non-converted excited light. From this figure, it is evident that saturated conversion has been performed in this embodiment.

Figure 5:
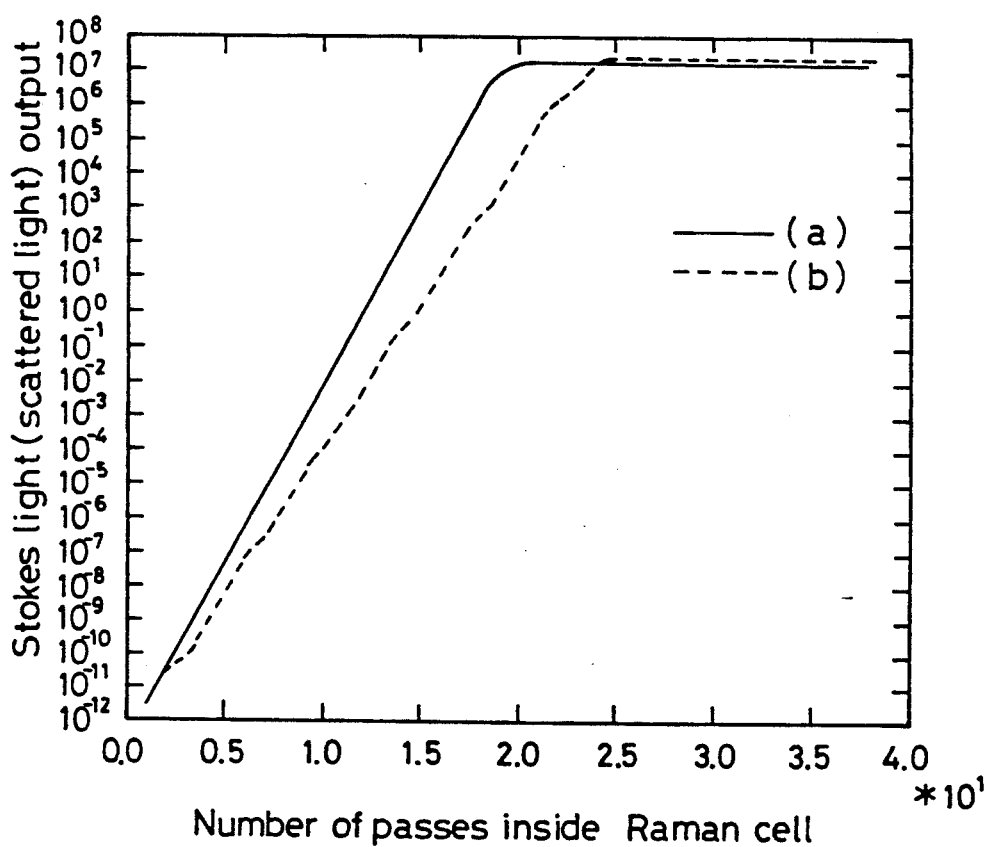
FIG. 5 shows the aspect of growth of scattered light energy against the number of reflection inside Raman cell of conventional $TEM_{00}$ mode beam (a) and multimode beam (b) as obtained by calculation.
Figure 6:
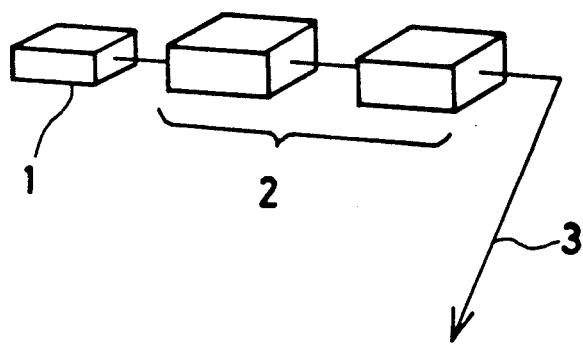
FIG. 6 is an arrangement of conventional type Raman laser system.
Figure 6:
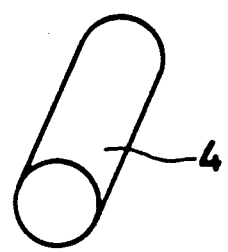

FIG. 5 represents the aspect of the growth of scattered light energy against the number of reflection inside Raman cell of conventional $TEM_{00}$ mode beam (a) and multimode beam (b) as obtained from calculation. As it is shown in this figure, multi-mode beam (b) is slower than conventional $TEM_{00}$ mode beam (a), but it is evident that there is no difference in the generated energy if saturated conversion is performed.

According to the system of the present invention, the quantity required of $CO_2$ laser system for excitation can be extremely reduced. Because saturated conversion of excited light can be performed by multimode Raman cell, the input electric energy required for obtaining the same energy of the light of 16 μm, which is scattered light, is reduced, and the system efficiency is increased.

What is claimed is:

1. A multimode Raman laser system for performing Raman conversion, comprising a transversely excited atmospheric pressure $CO_2$ laser means for injecting a laser beam for excitation into Raman cell, wherein said transversely excited atmospheric pressure $CO_2$ laser means is an unstable resonator type oscillator, and wherein said Raman cell is a multimode Raman cell.

2. A multimode Raman laser system according to claim 1, wherein said unstable resonator type oscillator comprises a concave mirror and a convex mirror having a reflecting film so that reflectivity is gradually decreased from center to outer periphery, and said concave mirror and said convex mirror are placed face-to-face to each other within said resonator.

3. A multimode Raman laser system according to claims 1 or 2, wherein said multimode Raman cell comprises a pair of concave mirrors placed face-to-face to each other airtightly and provided separately with a laser beam injection hole and a laser beam output hole, and wherein parahydrogen is filled inside.

* * * * *